United States Patent [19]

Aubel et al.

[11] 4,303,095

[45] Dec. 1, 1981

[54] LOW-DIFFERENTIAL PRESSURE DELAY VALVE

[75] Inventors: John A. Aubel; William H. Bose; James H. Burrows, all of Decatur, Ill.

[73] Assignee: Borg-Warner Corporation, Chicago, Ill.

[21] Appl. No.: 155,241

[22] Filed: Jun. 2, 1980

[51] Int. Cl.³ .......................... F16K 17/18; F02M 3/00

[52] U.S. Cl. ................................ 137/493.8; 123/339; 137/513.7; 137/510; 137/DIG. 9

[58] Field of Search ............... 123/320, 339, 341, 389, 123/409; 137/493.8, 513.3, 513.7, 510, 599, DIG. 9

[56] References Cited

U.S. PATENT DOCUMENTS

| | | | |
|---|---|---|---|
| 3,730,154 | 5/1973 | Vartanian . | |
| 3,996,955 | 12/1976 | Kawabata . | |
| 4,010,721 | 3/1977 | Ludwig . | |
| 4,079,750 | 3/1978 | Ludwig . | |
| 4,098,850 | 7/1978 | Tamura | 137/513.7 X |
| 4,168,680 | 9/1979 | Kawai et al. . | |
| 4,182,291 | 1/1980 | Ito | 123/339 |

*Primary Examiner*—Robert G. Nilson

*Attorney, Agent, or Firm*—Florian S. Gregorczyk

[57] ABSTRACT

A low-differential pressure delay valve for vacuum controlled devices is disclosed. The valve has input, output and third chambers with the following: a controlled flow orifice in a separating plate between the input and output chambers; a port in the separating plate; a diaphragm operator sealingly positioned between the input and third chambers; a hollow stem with a seal on one end which stem communicates the output and third chambers by extending through the separating port, input chamber and the diaphragm, the stem is connected to and operative by the diaphragm operator; and, a bias spring of any predetermined force to maintain the port in a closed position is located in either the input or third chambers. The diaphragm operator opens the port to balance the pressures in the input and output chambers when the change in input pressure or vacuum is both greater than the bias force of the spring and too sudden for rapid dissipation through the fixed orifice. At pressure changes less than the bias force of the spring or at such a gradual rate as to dissipate through the orifice the valve will operate as a standard delay valve.

11 Claims, 3 Drawing Figures

Fig.1.
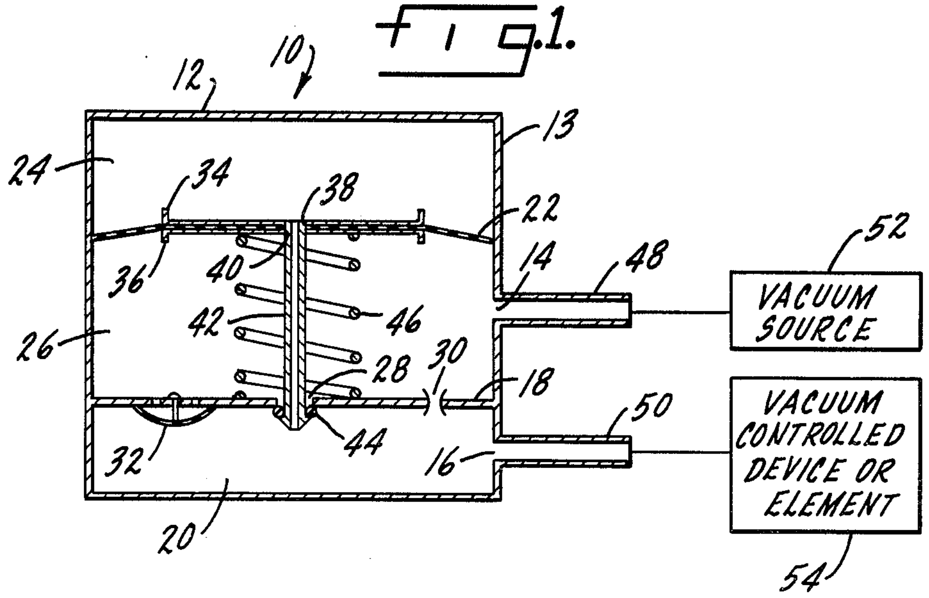
Fig.3.
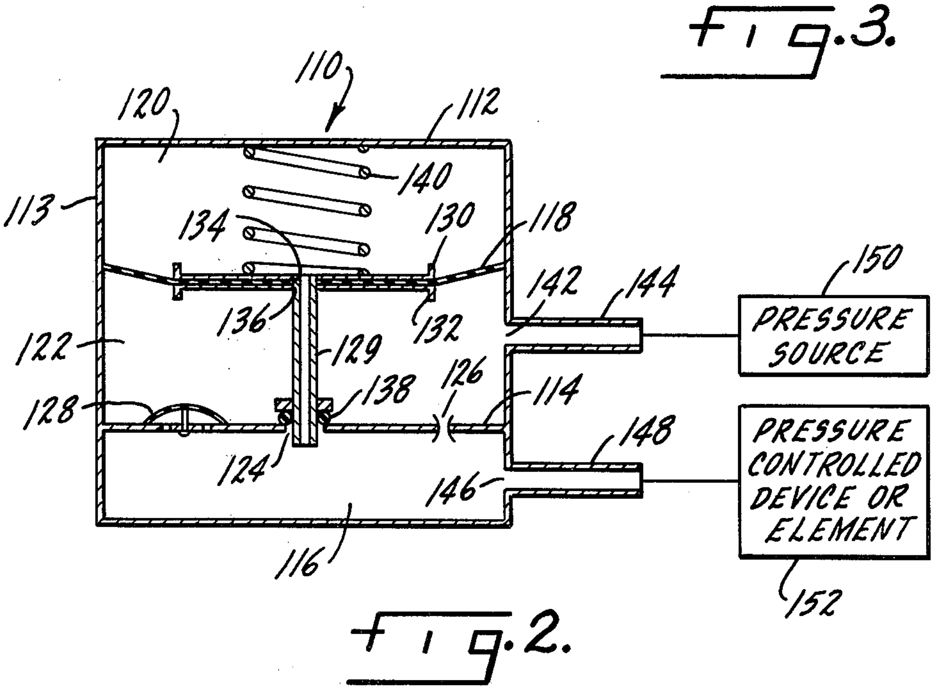
Fig.2.

LOW-DIFFERENTIAL PRESSURE DELAY VALVE

BACKGROUND OF THE INVENTION

This invention relates to a valve generally used to control a vacuum-motor in response to a vacuum signal from a monitored source. More specifically this invention relates to control of a vacuum-operated idle speed control system to provide a timed delay function for only an incremental portion of the total vacuum level change.

Delay valves are in widespread use through the automotive industry for control functions. In the present case a delay valve in a vacuum line may be connected, through a controlling dashpot, to the idle control of an automobile engine. The dashpot generally controls carburetor throttle opening in response to a signal from the delay valve, which valve is responsive to a vacuum signal, such as the manifold vacuum. A delay valve has a time delay between the sensing of a vacuum level change and responding or "delivering the message" of a vacuum level change to the controlled element or device.

In the case of an automobile the failure of the dashpot to quickly respond to a rapid reduction in the manifold vacuum due to a delay valve leads to a more widely open throttle, causing higher engine revolutions per minute (rpm) and consequently higher gas consumption. Present valve arrangements prevent the idle speed dashpot from overcompensating for suddenly changing engine conditions through relatively long time delays between an engine rpm change and a response change in the dashpot based upon the engine change.

A singular method of controlling a segment of engine rpm change would be to avoid the use of a delay valve, but this would lead to erratic engine operating conditions and pollution control problems. Alternatively, a controlled bypass of a delay valve, under a given condition or after a fixed parameter is exceeded, would be preferred. Such a bypass arrangement would still allow the delay valve to operate in its present mode of allowing delay times for gradual engine changing conditions, and nevertheless overcome that condition where there is a rapid change in the monitored condition, such as a rapid decrease in engine manifold vacuum (i.e., an increase in pressure level).

SUMMARY OF THE INVENTION

A low-differential pressure delay valve constructed in accordance with this invention has a body defining an enclosure. A separating plate in the enclosure defines input and output chambers, and a diaphragm operator is located to partition a third chamber from the input chamber. The separating plate defines a port, through which a hollow stem with a sealing means at one end communicates between the third chamber and the output chamber. The separating plate defines a fixed orifice, and an umbrella valve is mounted in the separating plate. Both the fixed orifice and the umbrella valve (when open) communicate between the input and output chambers. The hollow stem is displaceable by the diaphragm operator, and is biased by a spring to normally seal the port. An input control signal is communicated through an input port to the input chamber, and the output chamber communicates through an output port with a controlled device.

Particularly in accordance with the invention, displacement of the stem and seal from the separating plate port allows a rapid dissipation of a sudden change in vacuum or pressure differential above a fixed or predetermined pressure or vacuum level. Such a level can be the last two (2) inches of mercury pressure differential in a vacuum condition. The final two inch vacuum (pressure) differential is then dissipated through the fixed orifice in the usual manner, until there is an equilibrium condition between the input and output chambers. This last or fixed vacuum level is determined by the bias of the spring.

BRIEF DESCRIPTION OF THE DRAWING

In the two figures of the drawing, like reference numerals identify like components, and in that drawing:

FIG. 1 is a cross-section of a schematic illustration of a low-differential pressure delay valve; and FIG. 2 is a cross-section of an alternative embodiment of the low-differential pressure delay valve.

FIG. 3 is a cross-section of a schematic illustration of a porous plug insert in a fixed orifice.

DETAILED DESCRIPTION OF THE INVENTION

In FIG. 1 a low-differential pressure delay valve 10 is shown with a valve body or wall structure 12 having at least one sidewall 13, where body 12 defines an enclosure, an input port 14, and output port 16. The enclosure is divided into three chambers. A separating plate or member 18 is mounted in the body enclosure and along with body 12 thereby defines an output chamber 20. A diaphragm operator 22, sealingly mounted in the body enclosure, in conjunction with body 12 defines third chamber 24. Diaphragm operator 22, separating plate 18 and valve body 12 define an input chamber 26 positioned between chambers 20 and 24 in the body enclosure.

Separating plate 18 defines a centrally located port 28, which port 28 communicates between input chamber 26 and output chamber 20. Separating plate 18 defines a fixed orifice or aperture 30, and an umbrella valve arrangement 32 is also mounted in separating plate 18; both orifice 30 and valve 32 communicate between input chamber 26 and output chamber 20. Umbrella valve arrangement 32 is shown as being responsive to relieve higher pressure in the input chamber 26 and thereby balance this with the pressure of the output chamber 20. Fixed orifice 30 communicates between input chamber 26 and output chamber 20 to allow a gradual controlled rate of change of pressure between chambers 20 and 26.

Affixed on either side of diaphragm operator 22 are mounting plates 34 and 36 in chambers 24 and 26, respectively. Mounting plates 34 and 36 define centrally positioned openings 38 and 40, through which openings a hollow stem 42 is mounted, and thereafter openings 38 and 40 are sealed. Stem 42 extends through chamber 26 and port 28, thereby communicating chambers 20 and 24. The stem 42 is operable by diaphragm operator 22. Affixed to the end of hollow stem 42 protruding into chamber 20 through port 28 is a sealing device or seal 44 to seal port 28 when the valve is in the position shown in FIG. 1. A bias spring 46, mounted between separating plate 18 and mounting plate 36 in chamber 26, maintains seal 44 in a closed position in the valve position shown in FIG. 1. Spring 46 can be selected to provide a bias force of any predetermined value.

Port 14 which opens from input chamber 26 in sidewall 13 has a fitting 48 affixed therein for communication between a vacuum source 52 and chamber 26. Similarly port 16 which opens from output chamber 20 in sidewall 13 has a fitting 50 affixed therein for communication between chamber 20 and the vacuum controlled device or element 54, generally a vacuum motor or dashport.

The low-differential pressure delay valve 10 is responsive to a vacuum condition, in this case, a pressure condition below atmospheric pressure. The terms "input vacuum" and "output vacuum" refer to the conditions in input chamber 26 and output chamber 20, respectively. The source of the vacuum can be an internal combustion engine manifold vacuum or a vacuum pump, but in the case where manifold vacuum from an automobile engine is used the valve will track the changing vacuum conditions such that the following conditions will obtain: (1) the input vacuum condition will equal output vacuum at vacuum changes greater than the bias force of bias spring 46; and (2) at differential vacuums greater than the bias force of spring 46, valve 10 allows input vacuum to equal output vacuum immediately, and only provides a delay for the last portion of the differential in vacuum levels.

In the illustrated position of FIG. 1 delay valve 10 is shown with hollow stem 42 positioned so that seal 44 engages separating plate 18, thereby sealing port 28. Diaphragm operator 22 with mounting plates 34 and 36 is maintained in this position by bias force of spring 46. The pressure or vacuum level in output chamber 20 is continuously communicated to third chamber 24 through hollow stem 42.

As a vacuum is introduced to input chamber 26 it can communicate to chamber 20 through fixed orifice 30; however, the rate of this change is relatively slow by design and consequently the pressure level in chambers 20 and 24 is generally higher than that in chamber 26. As the vacuum depression in chamber 26 increases, that is to say as the pressure decreases, the differential between the pressures in chambers 26 and 20 increases until it is sufficient to overcome the predetermined bias force of spring 46. As the differential pressure between chambers 20 and 26 increases it is matched by the differential between chambers 24 and 26; therefore, diaphragm operator 22 flexes toward chamber 26, displacing hollow stem 42 and thus moving sealing device 44 away from port 28. This allows immediate communication between chambers 20 and 26 and, through stem 40, with chamber 24. This communication operates to balance the vacuum levels in chambers 20, 24 and 26, until bias spring 46 returns valve 10 to the illustrated position when the differential pressure between chambers 20 and 26 is less than the spring bias force. The remaining slight differential pressure between chambers 20 and 26 is then allowed to slowly dissipate through fixed orifice 30 which may be a porous plug.

The vacuum level in input chamber 26, is therefore, allowed to immediately communicate to chamber 20 when there are sudden changes in the vacuum input level above the bias force of spring 46. This sudden communication between chambers 26 and 20 would also occur should there be a sudden increase in pressure in the input chamber. This pressure increase would be communicated through umbrella valve 32 from chamber 26 to chambers 20 and 24. Thus it can be seen that the output vacuum level will be less than or equal to the input vacuum level. At that condition where the sum of the pressure level in the output chamber 20 and the bias spring force is equal to the pressure level in input chamber 26, valve seal 44 will seat to seal port 28. This final incremental vacuum differential between the input and output chambers is allowed to slowly balance through orifice 30.

In the case of an automobile dashpot controller the following problem is thereby resolved: at a false start, that is, sudden acceleration and then sudden deceleration, the change in vacuum level is communicated immediately from the manifold vacuum, through input chamber 26, to output chamber 20 and thereby to the dashpot (not shown) to reduce the throttle opening and engine rpm's. This reduction in engine rpm's results in fuel savings and gives the driver immediate control of the engine idle rate, as opposed to the present delay valves wherein the change in vacuum must dissipate solely through a fixed orifice.

FIG. 2 illustrates an alternative embodiment of a low-differential pressure delay valve 110 that is responsive to a change in pressure above atmospheric or above a reference pressure. Delay valve 110 is shown with valve body 112 having a sidewall 113, where valve body 112 defines an enclosure which is divided into three chambers.

A separating plate 114 is mounted in the body enclosure and, in cooperation with body 112, defines output chamber 116. A diaphragm operator 118 is sealingly mounted in the enclosure and, with valve body 112, defines a third chamber 120. The volume between diaphragm operator 118 and separating plate 114 in the enclosure is an input chamber 122.

Separating plate 114 defines a centrally located port 124 communicating between chambers 122 and 116. Separating plate 114 defines a fixed orifice 126. An umbrella valve 128, responsive to relieve a higher pressure from output chamber 116 to input chamber 122, is also mounted in separating plate 114. Inserted through port 124 is a hollow stem tube 129, extending through chamber 122 to chamber 120 through mounting plates 130 and 132 with central openings 134 and 136, respectively. These mounting plates 130, 132 are affixed on either side of diaphragm operator 118 in chambers 120 and 122, respectively. Tube 129 is affixed to mounting plates 130 and 132, and thus is displaceable by diaphragm 118. Central openings 134, 136 are sealed to prevent communication between chambers 122 and 120. Affixed to hollow stem tube 129 in chamber 122 is a sealing device or seal 138, movable with tube 129 and engageable with separating plate 114 to seal port 124 when the valve 110 is in the illustrated position. A bias spring 140 is positioned between mounting plate 130 and valve body 112 in chamber 120 to maintain sealing device 138 in the closed position, as shown.

Sidewall 113 defines an input port 142 with a fitting 144 affixed therein to communicate between a controlling or monitored pressure source 150 and input chamber 122 of valve 110. Sidewall 113 defines an output port 146 with a fitting 148 affixed therein to communicate between a pressure controlled device or element 152 and output chamber 116 of valve 110.

The position of valve 110 shown in FIG. 2 is such that sealing device 138 engages separating plate 114 to block communication between chambers 122 and 116 through port 124. The pressure level in chamber 116 is continuously communicated to chamber 120 through stem 129. Diaphragm operator 118, stem 129 and seal 138 are all maintained in their illustrated positions, closing port 124 by the force of bias spring 140. A relatively low pressure imposed in chamber 122 through port 142 from a pressure source 150 dissipates to output chamber 116 through fixed orifice 126. When the pressure in input chamber 122 is such that the pressure differential between third chamber 120 and input chamber 122 is greater than the bias force of spring 140, then diaphragm operator 118 moves to displace sealing device 138 upwardly and thus open port 124, allowing the pressures in chambers 116 and 122 to balance pressures above the force of bias spring 140. The pressures in chambers 116 and 120 are equivalent due to the communication by hollow stem 129; therefore, port 124 will remain open until the pressure differential between chambers 122 and 116 is equal to or less than the bias force of spring 140. Any pressure differential between chambers 122 and 116 less than the spring 140 bias force will be dissipated through fixed orifice 126. A sudden pressure increase in chamber 116 above that in chamber 122 would be rapidly balanced through umbrella valve 128.

Fixed orifice 30 of FIG. 1 and fixed orifice 126 of FIG. 2 are apertures which may have a porous plug 31 inserted therein to operate as a fixed orifice. In FIG. 3 a porous plug is illustrated as retained in a fixed orifice such as orifice 30 or 126.

The bias force of springs 46 and 140 in the disclosed embodiments of FIGS. 1 and 2 may be selected at any predetermined value down to two inches of mercury or greater.

While only specific embodiments of the invention have been described and shown, it is apparent that various alterations and modifications can be made therein. It is, therefore, the intention in the appended claims to cover all such modifications and alterations as may fall within the true scope and spirit of the invention.

We claim:

1. A low-differential pressure delay valve, comprising:

a wall structure defining an enclosure, a separating plate mounted in the enclosure to define an input chamber and an output chamber, which separating plate defines a port and an aperture between the input and output chambers, an umbrella valve mounted in the separating plate, a diaphragm operator mounted in the enclosure to define a third chamber adjacent the input chamber and to separate and seal the input and third chambers from each other, side wall structure defining an input port for the input chamber to provide an input connection, said wall structure also defining an output port for the output chamber to provide an output connection, a hollow stem with a sealing means affixed near one end thereof, which stem extends through the separating plate port, through the input chamber, and through the diaphragm operator into the third chamber, and a bias spring with a known bias force, positioned in one of the input and third chambers, effective to bias the diaphragm operator to close the separating plate port with the sealing means when the pressure difference between the input and output chambers less than the bias force of the spring.

2. A delay valve as claimed in claim 1, in which the separating plate aperture is a fixed orifice.

3. A delay valve as claimed in claim 1, and further comprising a porous plug mounted in the separating plate aperture, which plug defines at least one fixed orifice.

4. A delay valve as claimed in claim 1, wherein said spring provides a bias force of at least two inches of mercury pressure.

5. A delay valve as claimed in claim 2, wherein upon application of a rapid decrease in pressure to said input port that is not immediately dissipatable through the fixed orifice, the diaphragm is actuated to overcome the bias of the spring to open the separating plate port and thus balance the pressure levels in the input and output chambers and, through the fixed orifice, the diaphragm is actuated to overcome the bias of the spring to open the separating plate port and thus balance the pressure levels in the input and output chambers and, through the hollow stem, in the third chamber.

6. A delay valve as in claim 1 wherein the seal operates in the output chamber and the umbrella valve opens to the output chamber from the input chamber.

7. A delay valve as in claim 1 wherein the seal operates in the input chamber and the umbrella valve opens to the input chamber from the output chamber.

8. A delay valve as claimed in claim 6 which valve is responsive to and operated by a rapid decrease in pressure below atmospheric pressure to thereby control a vacuum controlled element.

9. A delay valve as claimed in claim 7 which valve is responsive to and operated by a rapid increase in pressure above atmospheric pressure to thereby control a pressure controlled element.

10. A low-differential pressure delay valve, comprising:

a wall structure defining an enclosure, a separating plate mounted in the enclosure to define an input chamber and an output chamber, which separating plate defines a port and an aperture with a porous plug between the input and output chambers, an umbrella valve mounted in the separating plate located to relieve an over-pressure condition in the input chamber, a diaphragm operator mounted in the enclosure to define a third chamber adjacent the input chamber and to separate and seal the input and third chambers from each other, said wall structure defining an input port for the input chamber to provide an input connection, said wall structure also defining an output port for the output chamber to provide an output connection, a hollow stem with a sealing means located in the output chamber and affixed near one end of the stem, which stem extends through the separating plate port, through the input chamber, and through the diaphragm operator into the third chamber, and a bias spring with a bias force of at least two inches of mercury pressure, positioned in the input chamber and effective to bias the diaphragm operator to close the separating plate port with the sealing means in the absence of a pressure difference greater than two inches of mercury between the output and input chambers.

11. A low-differential pressure delay valve, comprising:

a wall structure defining an enclosure, a separating plate mounted in the enclosure to define an input chamber and an output chamber, which separating plate defines a port and an aperture with a porous plug between the input and output chambers, an umbrella valve mounted in the separating plate positioned to relieve an over-pressure condition in the output chamber, a diaphragm operator mounted in the enclosure to define a third chamber adjacent the input chamber and to separate and seal the input and third chambers from each other, said wall structure defining an input port for the input chamber to provide an input connection, said wall structure also defining an output port for the output chamber to provide an output connection, a hollow stem with a sealing means located in the input chamber and affixed near one end of the stem, which stem extends through the separating plate port, through the input chamber, and through the diaphragm operator into the third chamber, thus providing a conduit between the output chamber and the third chamber, and a bias spring, with a bias force of at least two inches of mercury pressure, positioned in third chamber, effective to bias the diaphragm operator to close the separating plate port with the sealing means in the absence of a pressure difference greater than two inches of mercury between the input and output chambers.

* * * * *

UNITED STATES PATENT AND TRADEMARK OFFICE
CERTIFICATE OF CORRECTION

PATENT NO. : 4,303,095

DATED : December 1, 1981

INVENTOR(S) : JOHN ANTON AUBEL, et al

It is certified that error appears in the above—identified patent and that said Letters Patent is hereby corrected as shown below:

Column 5, line 50 cancel "side" and insert -- said --.

Signed and Sealed this

*Ninth* Day of *February 1982*

[SEAL]

*Attest:*

GERALD J. MOSSINGHOFF

*Attesting Officer* *Commissioner of Patents and Trademarks*